(12) United States Patent
Huang

(10) Patent No.: US 8,408,713 B2
(45) Date of Patent: Apr. 2, 2013

(54) LENS ARRAYS WITH ANGLE DIFFERENCE AND PROJECTION APPARATUS

(75) Inventor: June-Jei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 323 days.

(21) Appl. No.: 12/908,292

(22) Filed: Oct. 20, 2010

(65) Prior Publication Data

US 2011/0090468 A1    Apr. 21, 2011

(30) Foreign Application Priority Data

Oct. 20, 2009 (TW) ................ 98135425 A

(51) Int. Cl.
*G03B 21/14* (2006.01)
*G03B 21/26* (2006.01)
*G03B 21/60* (2006.01)
*G02B 27/10* (2006.01)

(52) U.S. Cl. ............ 353/38; 353/94; 359/455; 359/621; 359/624

(58) Field of Classification Search ................ 353/38, 353/94; 359/456, 455, 619, 621, 624
See application file for complete search history.

(56) References Cited

U.S. PATENT DOCUMENTS

| 3,667,832 | A  | * | 6/1972  | Matsumura et al. | 359/653 |
| 5,615,045 | A  | * | 3/1997  | Takuma et al.    | 359/456 |
| 7,619,824 | B2 | * | 11/2009 | Poulsen          | 359/621 |
| 2003/0161047 | A1 | * | 8/2003 | Lee et al.       | 359/624 |
| 2003/0169376 | A1 |   | 9/2003 | Ouchi et al.     |         |
| 2005/0219847 | A1 |   | 10/2005 | Ikeda et al.    |         |

FOREIGN PATENT DOCUMENTS

| CN | 1677226 A | 10/2000 |
| CN | 1444395 A | 9/2003 |

* cited by examiner

*Primary Examiner* — Georgia Y Epps
*Assistant Examiner* — Magda Cruz
(74) *Attorney, Agent, or Firm* — Muncy, Geissler, Olds & Lowe, PLLC

(57) ABSTRACT

A lens array set for a projection apparatus is provided. The lens array set comprises a first lens array and a second lens array. The first lens array has a plurality of first lens units which are rectangle-shaped and a side thereof that defines the first direction. The second lens array, which is parallel with the first lens array, has a plurality of second lens units which has a rectangle shape and a side thereof that defines the second direction. Each of the second lens units is set correspondingly to each of the first lens units, and the center of each second lens unit and the center of each first lens unit are coaxial. A rotation angle is substantially defined between the first direction and the second direction depending on the difference between the rectangle shapes of the first and the second lens units. When adopting the present invention in the projection apparatus, the light source efficiently provides light for the micro-display.

20 Claims, 10 Drawing Sheets

LENS ARRAYS WITH ANGLE DIFFERENCE AND PROJECTION APPARATUS

This application claims priority to Taiwan Patent Application No. 098135425 filed on Oct. 20, 2009.

CROSS-REFERENCES TO RELATED APPLICATIONS

Not applicable.

BACKGROUND OF THE INVENTION

1. Field of the Invention

The present invention provides a lens set for a projection apparatus. In particular, the present invention provides a lens set for reducing light loss in a projection apparatus.

2. Descriptions of the Related Art

Due to advantages, such as a long service, life, low operation temperature and immediate switching capabilities, light emitting diodes (LEDs) have gradually replaced ultra high performance (UHP) mercury bulbs as light sources of projection apparatuses. When LEDs are adopted as light sources of the projection apparatus, the design and disposition of optical elements in the projection apparatus must also be considered to achieve desirable light availability and light distribution uniformity.

With regards to light availability, most LEDs are formed into the shape of a square so that the shape of the light projection emitted by an LED is also substantially square-shaped. However, when a square light is projected onto a non-square micro-display device such as a digital micromirror device (DMD), a liquid crystal display (LCD), or a liquid crystal on silicon (LCOS) (because the micro-display device must be of a specific length-to-width ratio to fit display requirements), the shape of the light fails to conform to that of the micro-display device, thereby leading to reduction in the light availability. For purposes of minimizing the light loss when the light is projected onto the micro-display device, a number of optical elements for altering the shapes of light projection have emerged. Common optical elements include tapered light pipes, anamorphic prisms and cylinder lenses. By means of such optical elements, the light projection shape of the LED can be altered to satisfy an aspect ratio when being projected onto the micro-display device; however, when the light passes through the aforesaid optical elements, the light source shape tends to be altered, leading to problems such as a mismatch between the light source shape with the projection lens opening.

Furthermore, when a single lens is used to focus, light distribution non-uniformity can occur when the light is projected onto the micro-display device through the single lens. The non-uniformity results in too much luminance on the central portion of the resulting image but insufficient luminance on the peripheral portions. Accordingly, a lens array has been developed in the art to overcome these shortcomings.

FIG. 1A illustrates a projection apparatus 1. The projection apparatus 1 comprises an LED light source module 11, lens arrays 13, 14 and a micro-display device 15. The LED light source module 11 has a plurality of LEDs 12. Light generated by the LEDs 12 is focused by a plurality of lens units 131, 141 of the two lens arrays 13, 14 in such a way that the light is divided into a plurality of blocks for projection, thereby mitigating the over-concentration of the light when focused using a single lens. Thus, uniform distribution of the light on the micro-display device 15 can be achieved.

With reference to FIG. 1B and FIG. 1C together, an optical path will be described in detail. FIG. 1B illustrates a schematic view of a first optical path. Here, the lens array 13 focuses the light of the LED light source module 11 onto the lens units 141 of the lens array 14. To increase the light availability, the length-to-width ratio of each of the lens units 141 is made to be identical to that of the LED light source module 11. In other words, in order for the light to be utilized completely with no light leakages after the light of the LED light source module 11 is focused, the length-to-width ratio of each of the lens units 141 is identical to that of the LEDs of the LED light source module 11. Next, FIG. 1C illustrates a schematic view of a second optical path. In the second optical path, because the light transmitted through each of the lens units 131 must be focused onto the micro-display device 15 through the lens array 14, the lens units 131 and 141 must be designed to have the same area in order for the light of each of the lens units 131 to be focused onto the micro-display device 15 through a corresponding lens unit 141. However, as described above, the lens units 131 must be designed to match the shapes of the lens units 141, so it is difficult for a lens array set to alter the light projection shape of the LEDs 12. Consequently, in the second optical path, light loss will be caused due to the different aspect ratios of the light projection shape and the shape of the micro-display device 15.

Accordingly, an urgent need exists in the art to provide a solution that can meet demands of both the light availability and the light distribution uniformity by arranging simple optical elements into the limited space of the projection apparatus.

SUMMARY OF THE INVENTION

In order to solve the aforesaid problem, an objective of the present invention is to provide a lens array set for a projection apparatus, which is adapted to alter the light projection shape of an LED into a length-to-width ratio conforming to that of a micro-display device. The lens array set is also adapted to uniformly distribute the light that is projected onto the micro-display device.

To achieve the aforesaid objective, the present invention provides a lens array set for a projection apparatus, which comprises a plurality of first lens arrays and a plurality of second lens arrays. Each of the first lens arrays has a plurality of first lens units. Each of the first lens units is a rectangle and has a first side to define the first direction. Each of the second lens arrays is parallel to each of the first lens arrays and has a plurality of second lens units. Each of the second lens units is a rectangle and has a second side to define the second direction. The projection of the first direction on the second lens arrays and the second direction substantially define the rotation angle (θ). Each of the second lens units is disposed correspondingly to each of the first lens units, while the center of each of the first lens units is coaxial with the center of a corresponding second lens unit.

Another objective of the present invention is to provide a projection apparatus, which comprises an LED light source module, the aforesaid lens array set and a micro-display device. The LED light source module is adapted to generate a light which is projected onto the micro-display device through the lens array set for imaging purposes.

According to the above description, the first lens unit of the present invention adopts the appropriate shape to modulate the light projection shape into a length-to-width ratio conforming to that of the micro-display device to prevent light loss. Moreover, the correspondence relationship between the first lens units and the second lens units further allows for uniform distribution of the projected light.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Hereinbelow, the lens array set of the present invention will be explained with reference to embodiments thereof. However, it should be appreciated that these embodiments are not intended to limit the present invention to any specific environment, applications or particular implementations described in these embodiments. Therefore, description of these embodiments is only for the purpose of illustration rather than limitation of the present invention.

Figure 1A:
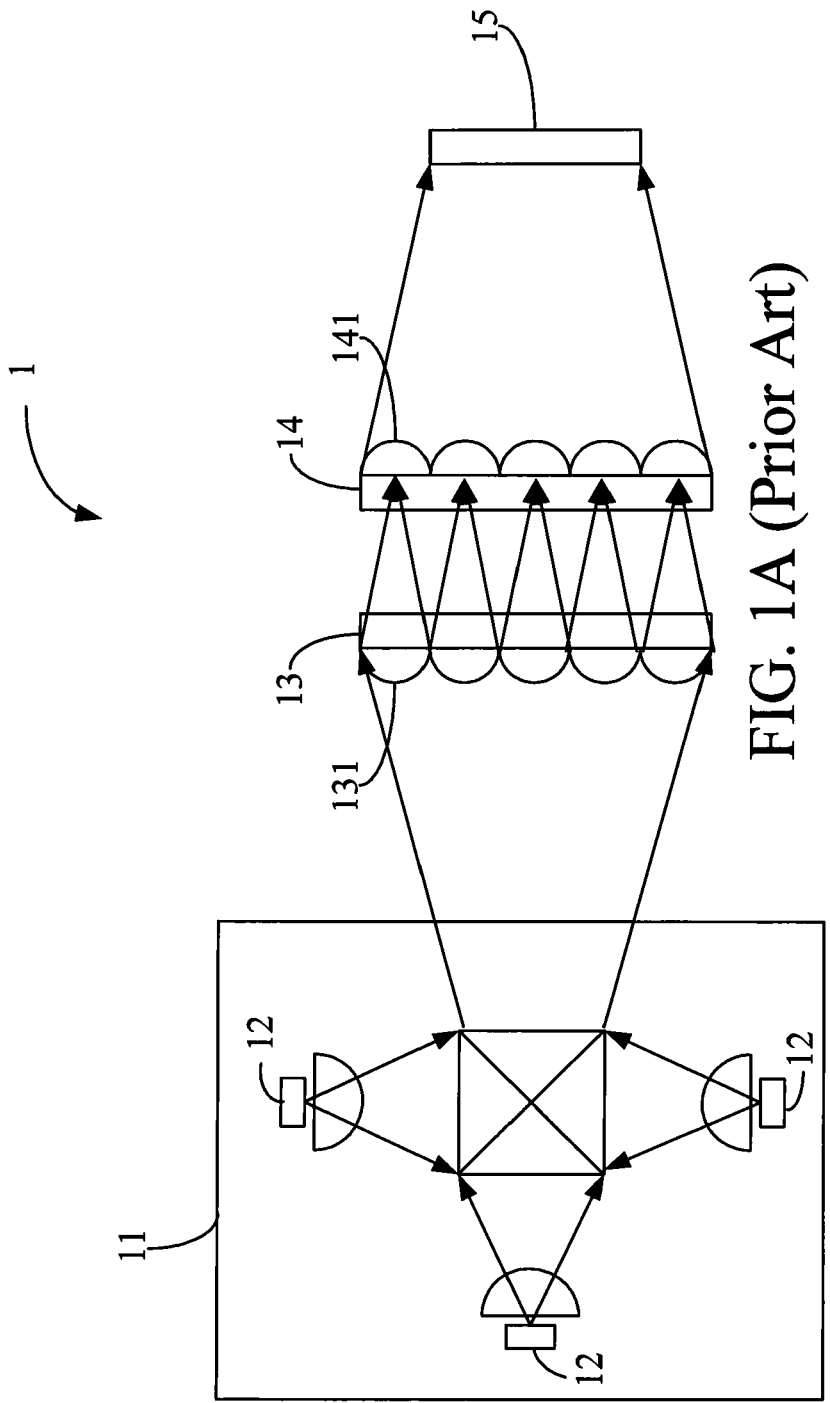
FIG. 1A is a schematic view of a projection apparatus of the prior art.
Figure 1B:
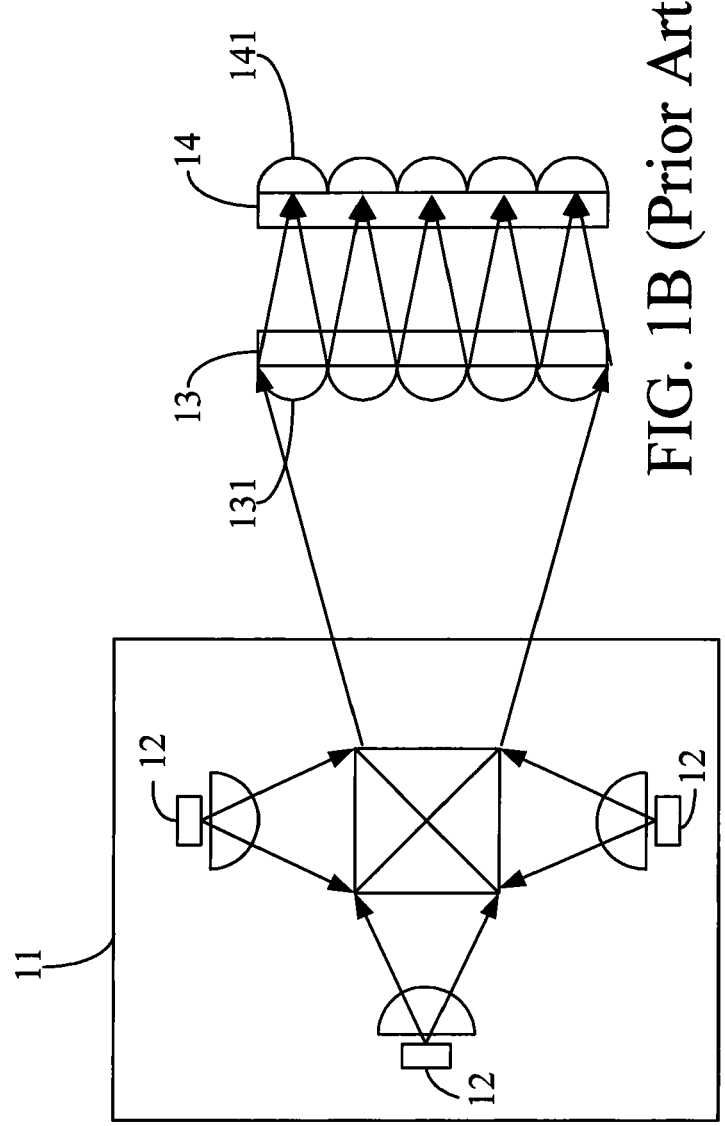
FIG. 1B is a schematic view of the first optical path of the projection apparatus shown in FIG. 1A.
Figure 1C:
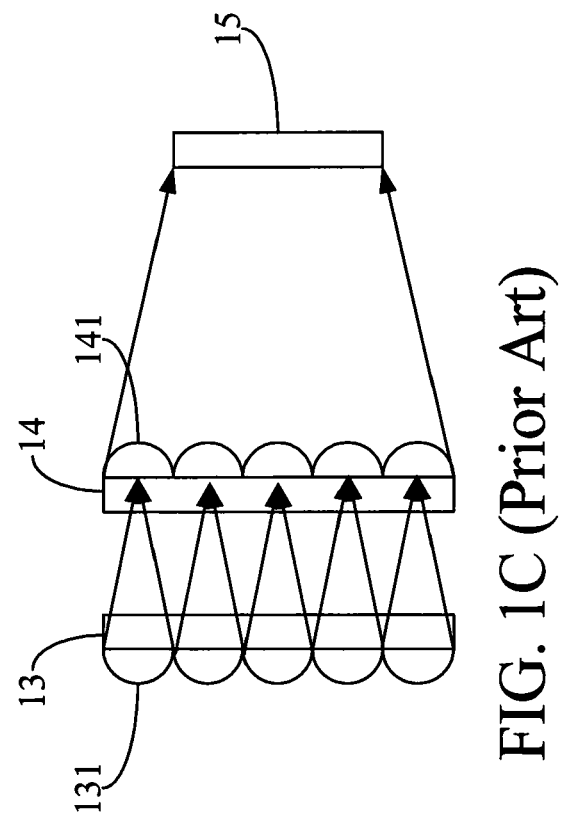
FIG. 1C is a schematic view of the second optical path of the projection apparatus shown in FIG. 1A.
Figure 2A:
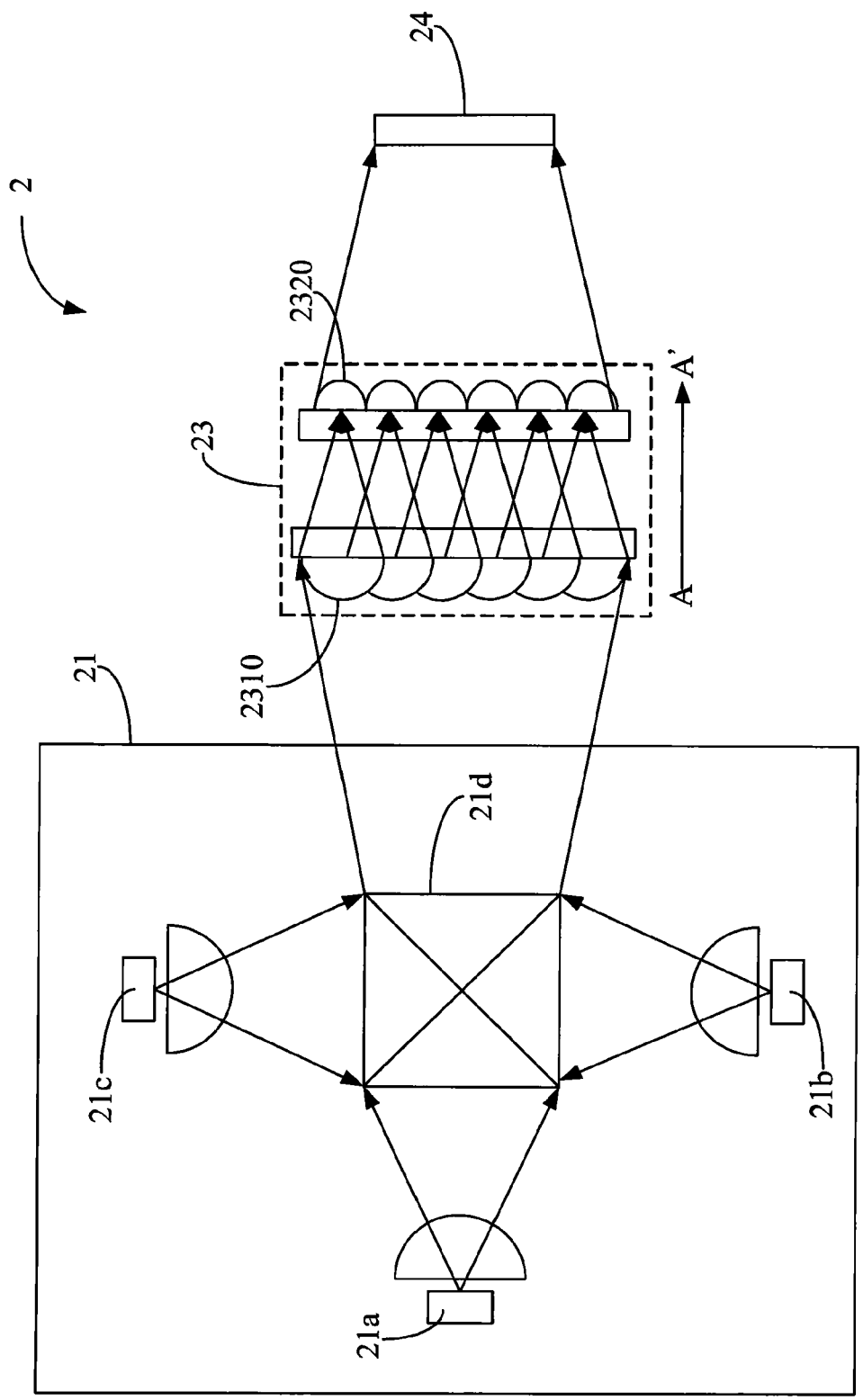
FIG. 2A is a schematic view of a projection apparatus of the present invention.

First, FIG. 2A illustrates a schematic view of a projection apparatus 2 of the present invention. The projection apparatus 2 comprises an LED light source module 21, a lens array set 23 and a micro-display device 24. The LED light source module 21 comprises a red LED 21a, a green LED 21b, a blue LED 21c and a light coupling component 21d. The LEDs 21a, 21b, 21c generate a light in a timed sequence, which is guided towards the lens array set 23 through the light coupling component 21d. It shall be appreciated that the internal structure of the LED light source module 21 is only for schematic illustration, and other examples may readily occur to those skilled in the art.

Figure 3A:
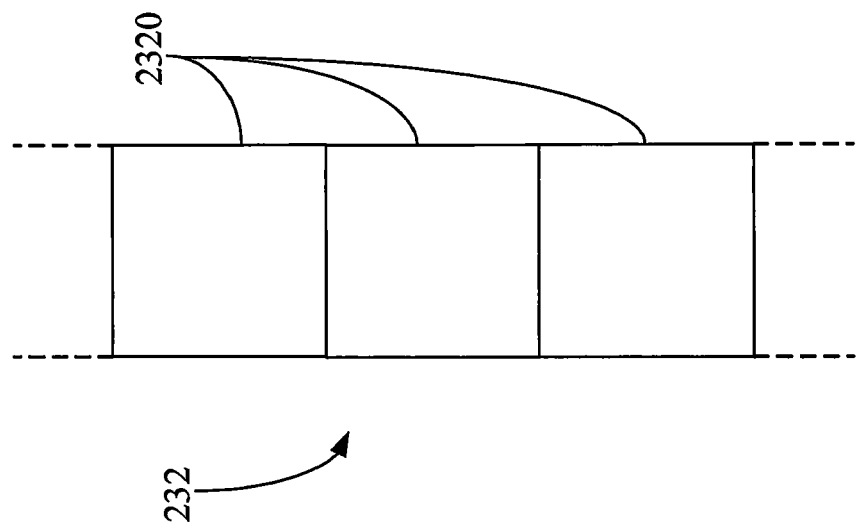
FIG. 3A is a schematic view of the first lens array and second lens array of the present invention.
Figure 3A:
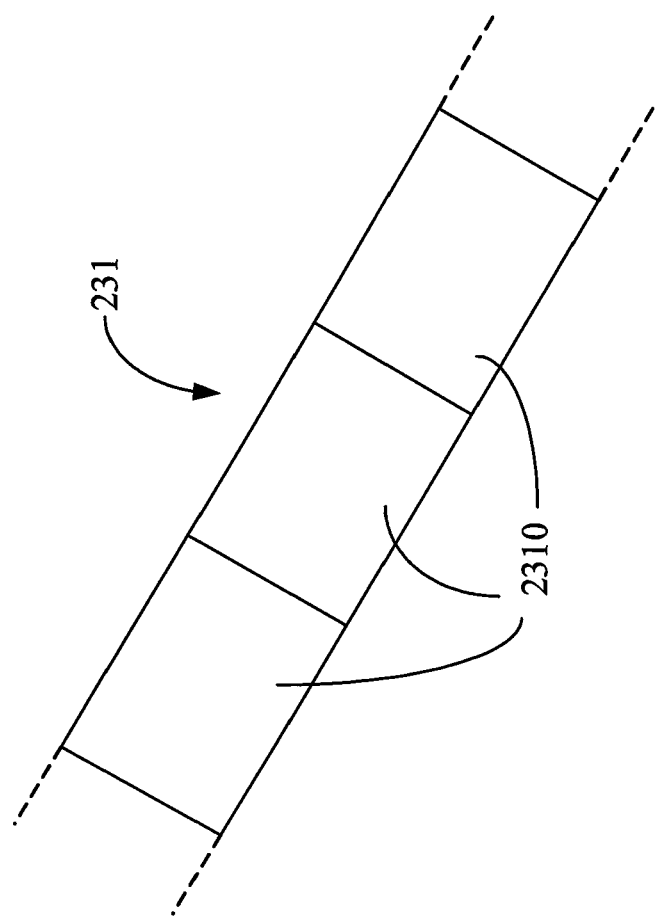
Figure 3B:
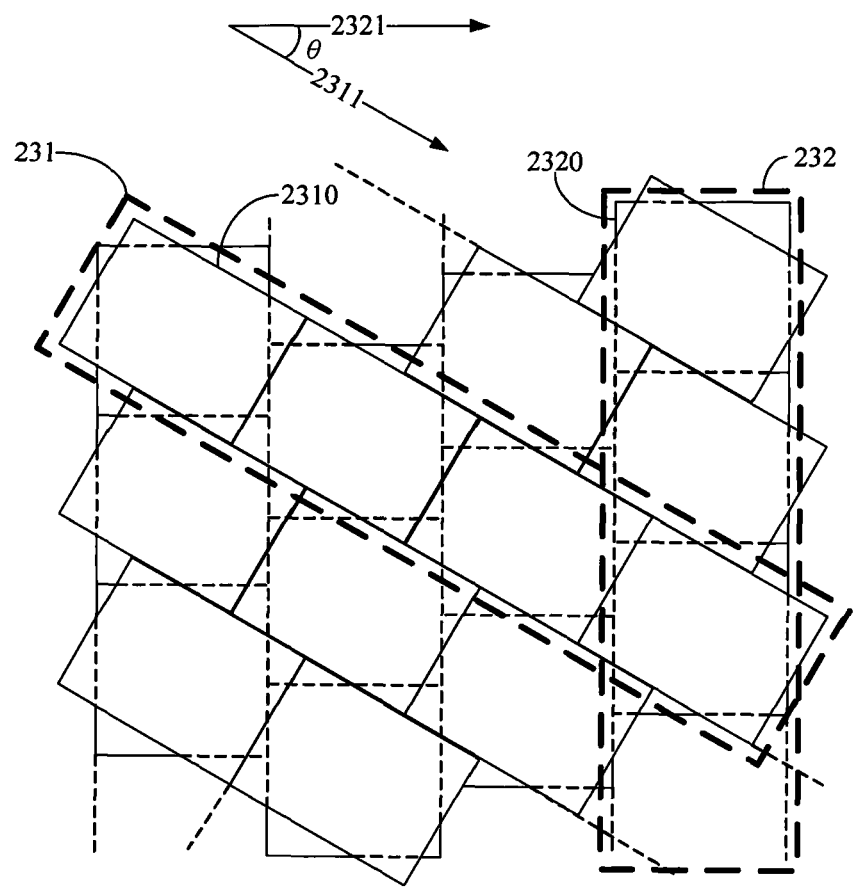
FIG. 3B is a schematic partial view of the lens array set viewed from direction A to A' shown in FIG. 2A.

Next, in reference to FIGS. 2A, 3A and 3B, the lens array set 23 has a plurality of first lens arrays 231 and a plurality of second lens arrays 232. Each of the first lens arrays 231 comprises a plurality of first lens units 2310, and each of the second lens arrays 232 comprises a plurality of second lens units 2320. The second lens array 232 as a whole are parallel to the first lens arrays 231 as a whole, and each of the second lens units 2320 is disposed correspondingly to each of the first lens units 2310. It shall be particularly appreciated that as each of the first lens units 2310 is disposed correspondingly to each of the second lens units 2320, a specific corresponding rotation angle is required, details of which will be explained hereinafter.

Because the micro-display device 24 is in the shape of a rectangle and the LED light source module 21 is a rectangular light source, the first lens units 2310 and the second lens units 2320 are designed to be rectangular with a first rectangular shape and a second rectangular shape respectively. In detail, the length-to-width ratio of the first rectangular shape of the first lens units 2310 is made to be identical to that of the rectangle shape of the micro-display device 24; similarly, the length-to-width ratio of the second rectangular shape of the second lens units 2320 is made to be identical to that of the rectangular light source of the LED light source module 21 (the reason will be described hereinafter). In this embodiment, the length-to-width ratio of the rectangle shape of the micro-display device 24 is 4:3, so the length-to-width ratio of the first rectangular shape is also 4:3; and the length-to-width ratio of the rectangular light source of the LED light source module 21 is 1:1, so the length-to-width ratio of the second rectangular shape is also 1:1. In other embodiments, depending on the different length-to-width ratios of the micro-display device 24, the length-to-width ratio of the first rectangular shape may also be 5:4, 16:9 or any other ratio.

Figure 2B:
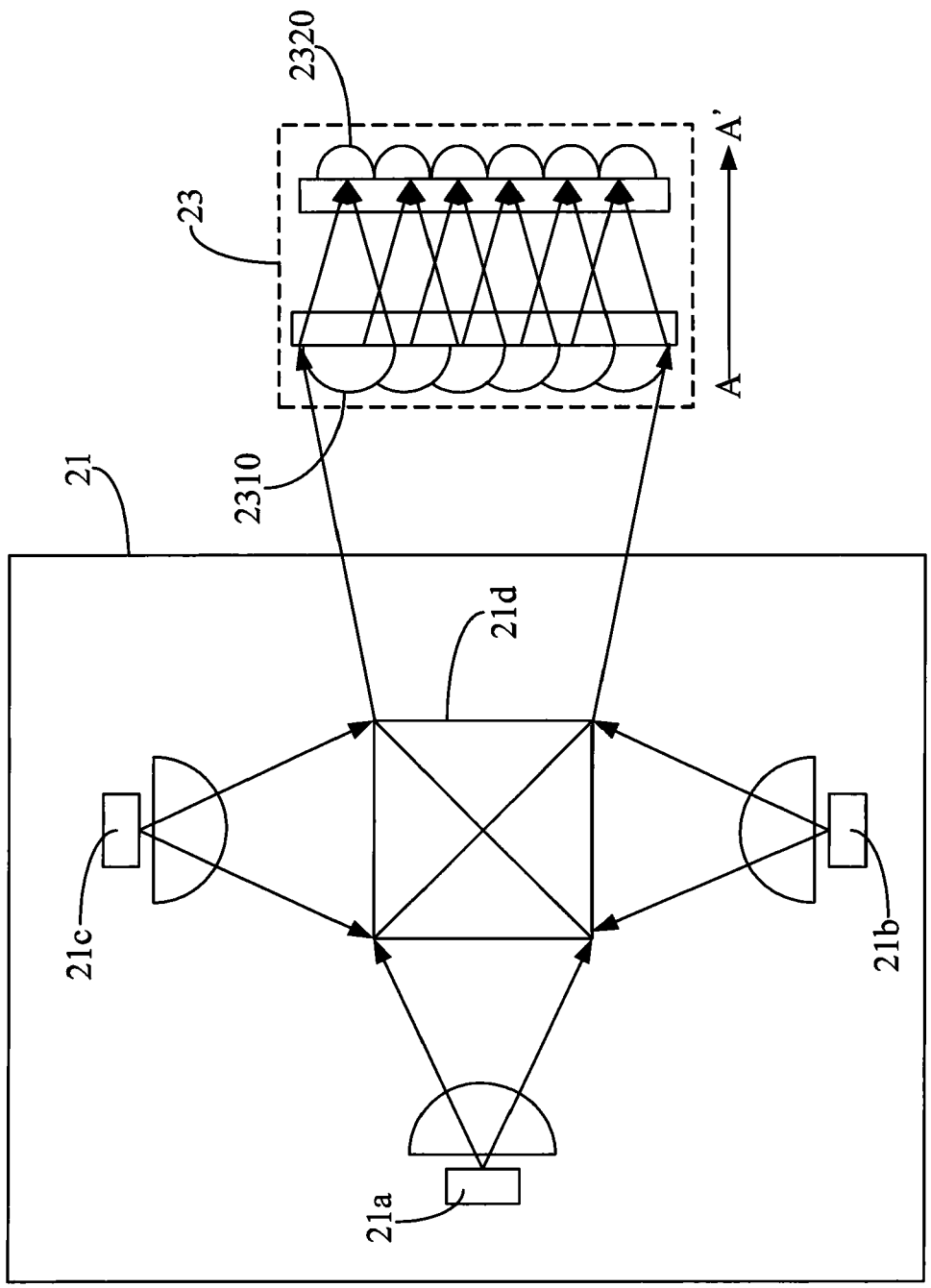
FIG. 2B is a schematic view of the first optical path of the projection apparatus shown in FIG. 2A.

FIG. 2B is a schematic view of the first optical path of the lens array set, while FIG. 3B is a schematic partial view of the lens array set viewed from the direction A to A' of FIG. 2A. First, in the first optical path shown in FIG. 2B, each of the first lens units 2310 of the first lens arrays 231 is adapted to focus a light generated by the LED light source module 21 to the second lens unit 2320 of the second lens arrays 232. Thus, the focus position of each of the first lens units 2310 substantially falls on the central position of a corresponding second lens unit 2320. It shall be particularly appreciated that the shape of the first lens units 2310 of the first lens arrays 231 will not alter the light projection shape of the LED light source module 21 but only serves as a lens for focusing. Since the light generated by the LED light source module 21 will not have its shape altered after passing through the first lens arrays 231, the shape of the second lens units 2320 of the second lens arrays 232 is designed according to the shape of the LED light source module 21 to prevent light leakage; in other words, each of the second lens units 2320 is manufactured to have a dimension ratio identical to that of the LED light source module 21, i.e., the aforesaid length-to-width ratio of 1:1 of the second rectangular shape. Thus, when the light generated by the LED light source module 21 is focused to the second lens arrays 232 through the first lens arrays 231, the light will be completely utilized by the second lens arrays 232.

Figure 2C:
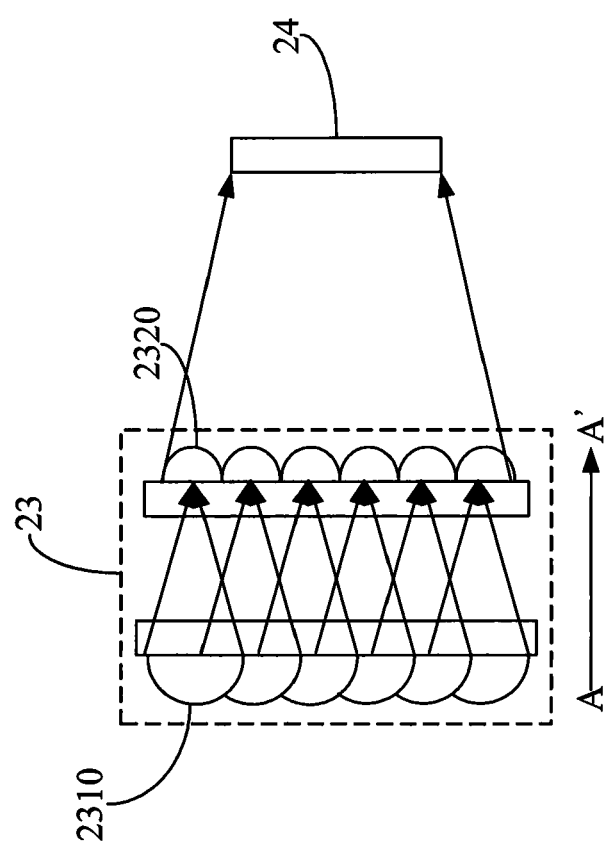
FIG. 2C is a schematic view of the second optical path of the projection apparatus shown in FIG. 2A.

Next, FIG. 2C is a schematic view of the second optical path of the lens array set. First, in the second optical path, the second lens arrays 232 are adapted to focus a light, which is projected by the first lens units 2310 of the first lens arrays 231, onto the micro-display device 24 through a subsequent optical device (not shown) to be subsequently imaged by the micro-display device 24. The focus position of each of the first lens units 2310 substantially falls on the central position of a corresponding second lens unit 2320, while the focus position of each of the second lens units 2320 substantially falls on the position of the micro-display device 24 for imaging purposes. It shall be particularly appreciated that the shape of the second lens units 2320 of the second lens arrays 232 will not alter the light projection shape projected by the first lens units 2310 of the first lens arrays 231 but only serves as a lens for focusing. Since the light projected by the first lens units 2310 of the first lens arrays 231 will not have its shape altered after passing through the second lens arrays 232, the shape of each of the first lens units 2310 of the first lens arrays 231 is designed according to the shape of the micro-display device 24 to prevent light leakage; in other words, each of the first lens units 2310 is manufactured to have a dimension ratio identical to that of the micro-display device 24, i.e., the aforesaid length-to-width ratio of 4:3 of the first rectangular shape. Thus, when the light projected by each of the first lens units 2310 of the first lens arrays 231 is focused onto the micro-display device 24 through the second lens arrays 232, no light leakage will occur at all.

Figure 3C:
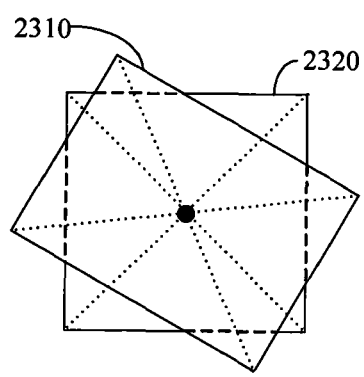
FIG. 3C is a schematic view illustrating the relative positions of the first lens unit of the first lens array and second lens unit of the second lens array of the present invention.

In more detail, with reference to FIGS. 2A and 3C, in the first optical path, the first lens units 2310 of the first lens arrays 231 are adapted to focus the light of the LED light source module 21 onto the second lens units 2320 of the second lens arrays 232; and in the second optical path, the second lens units 2320 of the second lens arrays 232 are adapted to focus the light projected by the first lens units 2310 of the first lens arrays 231 onto the micro-display device 24. To satisfy the two conditions simultaneously, the first lens units 2310 and the second lens units 2320 must be disposed in a manner so that their respective lens centers are aligned; i.e., as shown in FIG. 3B, the center (i.e., lens center) of each first lens unit 2310 is coaxially aligned with the center (i.e., lens center) of the corresponding second lens unit 2320 substantially. Furthermore, there are the same number of the first lens units 2310 as there are the second lens units 2320; both of which are in a one-to-one correspondence, so when the light is focused in the first optical path and in the second optical path respectively, no light leakage, light defect or partial availability of the light will occur.

Figure 4A:
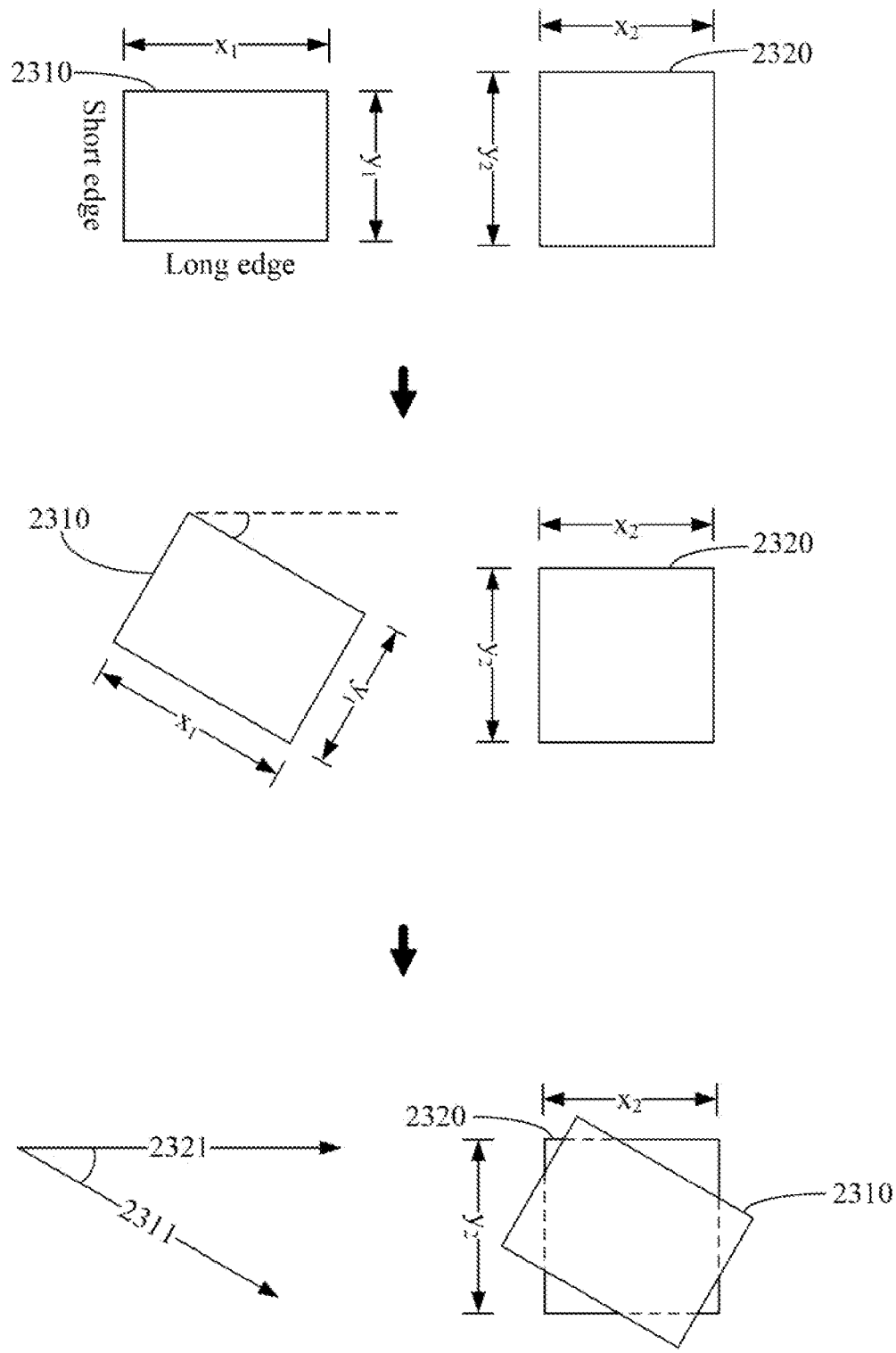
FIG. 4A is a schematic view illustrating the adjustment of the relative positions of the first lens unit of the first lens array and the second lens unit of the second lens array of the present invention.
Figure 4B:
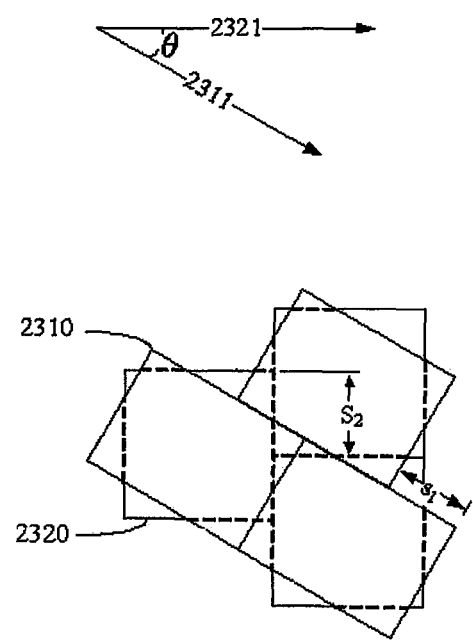
FIG. 4B is another schematic view illustrating the relative positions of the first lens unit of the first lens array and the second lens unit of the second lens array of the present invention.

Considering the fact that the length-to-width ratio of the first lens units 2310 and that of the second lens units 2320 shall conform to that of the micro-display device 24 and that of the LED light source module 21 respectively, when the length-to-width ratio of the LED light source module 21 is different from that of the micro-display device 24, the first lens units 2310 and the second lens units 2320 will have different length-to-width ratios correspondingly. Thus, when disposed in the respective lens arrays, the first lens units 2310 and the second lens units 2320 must be adjusted properly to achieve such alignment of the lens centers thereof. For proper adjustment of the disposition of the first lens units 2310 and the second lens units 2320, FIGS. 4A and 4B illustrate schematic views of the relative positions of the first lens units 2310 and the second lens units 2320. First, in reference to FIG. 4A, each of the first lens units 2310 has a first side and a third side, which have a first edge length $x_1$ and a third edge length $y_1$ respectively; and each of the second lens units 2320 have a second side and a fourth side, which have a second edge length $x_2$ and a fourth edge length $y_2$ respectively. The first side of the first lens unit 2310 defines the first direction 2311, while the third side is perpendicular to the first direction 2311. The second side of the second lens unit 2320 defines the second direction 2321 while the fourth side is perpendicular to the second direction 2321. In this embodiment, the second direction 2321 is substantially in the horizontal direction. The projection of the first direction 2311 on the second lens array 232, which is respective to the second direction 2321, substantially defines a rotation angle θ with a value of $$\theta = \cos^{-1}\left(\sqrt{\frac{x_2 \times y_1}{x_1 \times y_2}}\right)$$

It shall be particularly appreciated that in this embodiment, the first lens unit 2310 is of a rectangular shape, the second lens unit 2320 is of a square shape, and the first side is a long edge. In other embodiments, if neither the first lens unit 2310 nor the second lens unit 2320 is square-shaped, the first side of the first lens unit 2310 and the second side of the second lens unit 2320 are simultaneously long-edged or short-edged.

After rotation of the angle, adjustment still has to be made to the arrangement of each of the first lens arrays 231 and each of the second lens arrays 232 so that each of the first lens units 2310 correspond to each of the second lens units 2320 properly. First, in reference to FIG. 3B again, a plurality of first lens arrays 231 are disposed along the first direction 2311 and parallel to each other, while a plurality of second lens arrays 232 are disposed along the second direction 2321 and perpendicular to each other. Then, in reference to FIG. 4B, when the first lens units 2310 in adjacent first lens arrays 231 are arranged, the first relative displacement $s_1$ parallel to the first direction 2311 exists between the first lens units 2310 that are adjacent on their first sides. When the second lens units 2320 in the adjacent second lens arrays 232 are arranged, the second relative displacement $s_2$ perpendicular to the second direction 2321 exists between the second lens units 2320 that are adjacent on their fourth sides. The values of the first relative displacement $s_1$ and the second relative displacement $s_2$ are given by the equations $s_1=y_1 \times \tan \theta$ and $s_2=x_2 \times \tan \theta$ respectively.

In other words, with the aforesaid arrangement, a plurality of first lens units 2310 and a plurality of second lens units 2320 in identical numbers and area but with different length-to-width ratios can be arranged in a one-to-one correspondence without the problem of having the lens centers of the first lens units 2310 not aligned with those of the corresponding second lens units 2320.

Accordingly, through the aforesaid arrangement of the rectangular-shaped first lens units 2310 of the first lens arrays 231 corresponding to the length-to-width ratio of the micro-display device 24 and the rectangular-shaped second lens units 2320 of the second lens arrays 232 corresponding to the length-to-width ratio of the LED light source module 21, the length-to-width ratio of the light projection shape of the LED light source module 21 can be transformed into the length-to-width ratio conforming to the shape of the micro-display device 24 when the lens array set 23 of the present invention is used for the projection apparatus 2. Thereby, with maximum light availability, a uniformly projected light of the LED light source module 21 can be projected onto the micro-display device 24. This can effectively provide the light required for imaging by the micro-display device 24 and reduce light leakage, thereby effectively solving the problem of the prior art.

The above disclosure is related to the detailed technical contents and inventive features thereof, but not to limit the scope of the invention. People skilled in this field may proceed with a variety of modifications and replacements based on the disclosures and suggestions of the invention as described without departing from the characteristics thereof. The scope of the invention shall be covered in the following claims as appended.

What is claimed is:

1. A lens array set for a projection apparatus, comprising:
   a plurality of first lens arrays, each of the first lens arrays having a plurality of first lens units, each of the first lens units being a rectangle and each of the first lens units having a first side to define a first direction; and
   a plurality of second lens arrays parallel to the first lens arrays, each of the second lens arrays having a plurality of second lens units, each of the second lens units being a rectangle and each of the second lens units having a second side to define a second direction;
   wherein a projection of the first direction on the second lens array and the second direction substantially define a rotation angle ($\theta$), each of the second lens units is set correspondingly to each of the first lens units, and a center of each of the first lens units is coaxial to a center of each of the corresponding second lens units.

2. The lens array set as claimed in claim 1, wherein the sides are all long edges or all short edges.

3. The lens array set as claimed in claim 2, wherein
   each of the first lens arrays is parallel to the first direction, and adjacent first lens units of adjacent first lens arrays have a first relative displacement ($s_1$); and
   each of the second lens arrays is perpendicular to the second direction, and adjacent second lens units of adjacent second lens arrays have a second relative displacement ($s_2$).

4. The lens array set as claimed in claim 3, wherein each of the first lens units has a first rectangular shape and each of the second lens units has a second rectangular shape.

5. The lens array set as claimed in claim 4, wherein the first rectangular shape and the second rectangular shape have the same area.

6. The lens array set as claimed in claim 5, wherein the first lens units and the second lens units have the same amount.

7. The lens array set as claimed in claim 6, wherein
   each of the first lens units further has a third side perpendicular to the first direction, and the first side and the third side have a first edge length $x_1$ and a third edge length $y_1$ respectively;
   each of the second lens units further has a fourth side perpendicular to the second direction, and the second side and the fourth side have a second edge length $x_2$ and a fourth edge length $y_2$ respectively; and
   the rotation angle ($\theta$) is given by the following equation:

$$\theta = \cos^{-1}\left(\sqrt{\frac{x_2 \times y_1}{x_1 \times y_2}}\right).$$

8. The lens array set as claimed in claim 7, wherein
   the first relative displacement ($s_1$) is given by the following equation:

$$s_1 = y_1 \times \tan\theta; \text{ and}$$

the second relative displacement ($s_2$) is given by the following equation:

$$s_2 = x_2 \times \tan\theta.$$

9. The lens array set as claimed in claim 1, wherein each of the first lens units focuses on a corresponding second lens unit.

10. A projection apparatus, comprising:
    a light emitting diode (LED) light source module adapted to generate a light;
    a lens array set as claimed in claim 1; and
    a micro display device, wherein the light projects to the micro display device through the lens array set.

11. The projection apparatus as claimed in claim 10, wherein the sides are all long edges or all short edges.

12. The projection apparatus as claimed in claim 11, wherein
    each of the first lens arrays is parallel to the first direction, and adjacent first lens units of adjacent first lens arrays have a first relative displacement ($s_1$);
    each of the second lens arrays is perpendicular to the second direction, and adjacent second lens units of adjacent second lens arrays have a second relative displacement ($s_2$).

13. The projection apparatus as claimed in claim 12, wherein each of the first lens units has a first rectangular shape and each of the second lens units has a second rectangular shape.

14. The projection apparatus as claimed in claim 13, wherein the first rectangular shape and the second rectangular shape have the same area.

15. The projection apparatus as claimed in claim 14, wherein the first lens units and the second lens units have the same amount.

16. The projection apparatus as claimed in claim 15, wherein
    each of the first lens units further has a third side perpendicular to the first direction, and the first side and the third side have a first edge length $x_1$ and a third edge length $y_1$ respectively;
    each of the second lens units further has a fourth side perpendicular to the second direction, and the second side and the fourth side have a second edge length $x_2$ and a fourth edge length $y_2$ respectively; and
    the rotation angle ($\theta$) is given by the following equation:

$$\theta = \cos^{-1}\left(\sqrt{\frac{x_2 \times y_1}{x_1 \times y_2}}\right).$$

17. The projection apparatus as claimed in claim 16, wherein
    the first relative displacement ($s_1$) is given by the following equation:

$$s_1 = y_1 \times \tan\theta; \text{ and}$$

the second relative displacement ($s_2$) is given by the following equation:

$$s_2 = x_2 \times \tan\theta.$$

18. The projection apparatus as claimed in claim 13, wherein the micro display device is a rectangle and has an identical length-to-width ratio with the first rectangular shape.

19. The projection apparatus as claimed in claim 18, wherein the LED light source module is a rectangular light source, and the rectangular light source has the same length-to-width ratio as the second rectangular shape.

20. The projection apparatus as claimed in claim 10, wherein each of the first lens units focuses on a corresponding second lens unit substantially, and each of the second lens units focuses on the micro display device substantially.

* * * * *